United States Patent [19]
Shaw et al.

[11] Patent Number: 5,917,914
[45] Date of Patent: Jun. 29, 1999

[54] DVD DATA DESCRAMBLER FOR HOST INTERFACE AND MPEG INTERFACE

[75] Inventors: Yih-Suey Shaw, Saratoga; Chi-Ming Chu, Fremont, both of Calif.

[73] Assignee: Cirrus Logic, Inc., Fremont, Calif.

[21] Appl. No.: 08/845,725

[22] Filed: Apr. 24, 1997

[51] Int. Cl.⁶ .................................................. H04L 9/00
[52] U.S. Cl. ............................ 380/42; 380/43; 380/44; 380/4
[58] Field of Search .................. 380/43, 44, 42, 380/4, 5

[56] References Cited

U.S. PATENT DOCUMENTS

| | | | |
|---|---|---|---|
| 4,639,548 | 1/1987 | Oshima et al. | 380/43 |
| 4,668,103 | 5/1987 | Wilson | 380/30 |
| 4,669,118 | 5/1987 | Pospischil | 380/43 |
| 5,016,275 | 5/1991 | Smith | 380/43 |
| 5,285,497 | 2/1994 | Thatcher, Jr. | 380/49 |
| 5,365,589 | 11/1994 | Gutowitz | 380/43 |
| 5,386,469 | 1/1995 | Yearsley et al. | 380/3 |
| 5,406,627 | 4/1995 | Thompson et al. | 380/44 |
| 5,535,327 | 7/1996 | Verinsky et al. | 395/182.03 |
| 5,581,715 | 12/1996 | Verinsky et al. | 395/309 |

*Primary Examiner*—Eric W. Stamber
*Assistant Examiner*—Toby Anderson
*Attorney, Agent, or Firm*—Robert P. Bell; Dan A. Shifrin

[57] ABSTRACT

A descrambler for a Digital Versatile Disk (DVD) is provided within a DVD controller to allow for real-time descrambling of DVD data from the DVD buffer. The built-in descrambler also allows the controller to interface with a Host Adapter (e.g., ATAPI Host) or MPEG II decoder. The descrambling circuit reads four bits of an identifier portion of each sector. These four bits are used to access a look up table LUT in the descrambler for retrieving a 15 bit seed. The fifteen bit seed is used to generate a descrambling patter, which, when XORed with scrambled data, will descramble data on a byte-by-byte basis. The descrambling pattern is generated on a flash basis, by performing eight shift operations and XOR operations simultaneously, allowing for descrambling one byte per clock cycle. In the preferred embodiment, the flash descrambler may use a programmed register transfer logic (RTL) to generate sixteen bits of descrambling pattern at a time, to allow for descrambling on a word-by-word basis at the rate of one word per clock cycle.

16 Claims, 5 Drawing Sheets

DVD DATA DESCRAMBLER FOR HOST INTERFACE AND MPEG INTERFACE

FIELD OF THE INVENTION

The present invention relates generally to the field of data storage and descrambling, more specifically to a method and apparatus for descrambling data retrieved from a Digital Versatile Disk (DVD).

BACKGROUND OF THE INVENTION

The Digital Versatile Disk (DVD) is a high data density optical disk recently introduced which has a form factor approximating that of a conventional CD-ROM (Compact Disk, Read Only Memory). The DVD, however, may store an appreciably larger amount of data due to higher data density storage techniques, as well as the use of double sides and multiple "layers" within a disk. Data from different "layers" within one side may be read by refocusing a read laser beam to a different depth.

As a result of this increased storage capacity, DVDs, as their name implies, may be used to store a usable amount of video data (e.g., movies and the like) as well other types of data commonly stored on CD-ROMS (e.g., music, multimedia software, data, programs, and the like). Prior art CD-ROMs may have used one of a variety of formats for storing data, depending upon whether music, data, or video (e.g., MPEG video) was to be stored. In contrast, the DVD may be provided with one simpler format than the prior art CD-ROM.

DVD data is scrambled and an error correction code is generated for the scrambled data. As DVD players and equipment are just reaching the market, many manufacturers may resort to using prior art CD-ROM controller integrated circuits (ICs) and rely upon a separate custom ASIC to perform DVD descrambling and error correction functions.

As a result, data retrieved from a DVD in a scrambled form may then need to be transferred to an external DVD descrambling ASIC, error corrected, descrambled, and then returned to the DVD controller (actually a prior art CD-ROM type controller) and stored in the data buffer. Such a technique is inefficient and requires an extra layer of circuitry.

DVD devices may be required to interface with ATAPI (AT Attachment Packet Interface) host (e.g., ATAPI card or the like) or an MPEG II (Motion Pictures Expert Group, version II) decoder, depending upon whether the data is to be used for video (e.g., MPEG II) or for computer data (e.g., ATAPI). In order to interface with both types of controllers, it may be desirable to output, in real time, descrambled DVD data at the output data buffer of the DVD device. Prior art techniques using separate custom ASICs for DVD descrambling may be not readily adaptable to provide an interface to both MPEG II and ATAPI host devices.

SUMMARY OF THE INVENTION

The present invention provides a built-in DVD descrambler for receiving and descrambling DVD data before such data is stored in an output data buffer. Received ID information is used to retrieve a descrambling seed from a look-up table. The seed in turn is used in a shift register and XOR gate to generate a pattern of data for descrambling scrambled DVD data.

This pattern of data may then be used to descramble received DVD data in real-time or near real-time by XORing the pattern with scrambled DVD data. The pattern generator, in a first embodiment, may generate eight bits (one byte) of pattern for every clock cycle.

In the preferred embodiment, a series of equations are programmed into a RTL (Register Transfer Logic) table to generate sixteen bits (two bytes) of pattern data per clock cycle to descramble sixteen bits (two bytes) of DVD data per clock cycle. By generating eight or sixteen bits during one clock cycle in a "flash" descrambling process, DVD data may be descrambled in a real-time or near real-time fashion.

Descrambled DVD data may then be stored in an output buffer for the DVD device. Such descrambled data may then be output to an ATAPI host controller or MPEG II decoder.

DETAILED DESCRIPTION OF THE INVENTION

Figure 3:
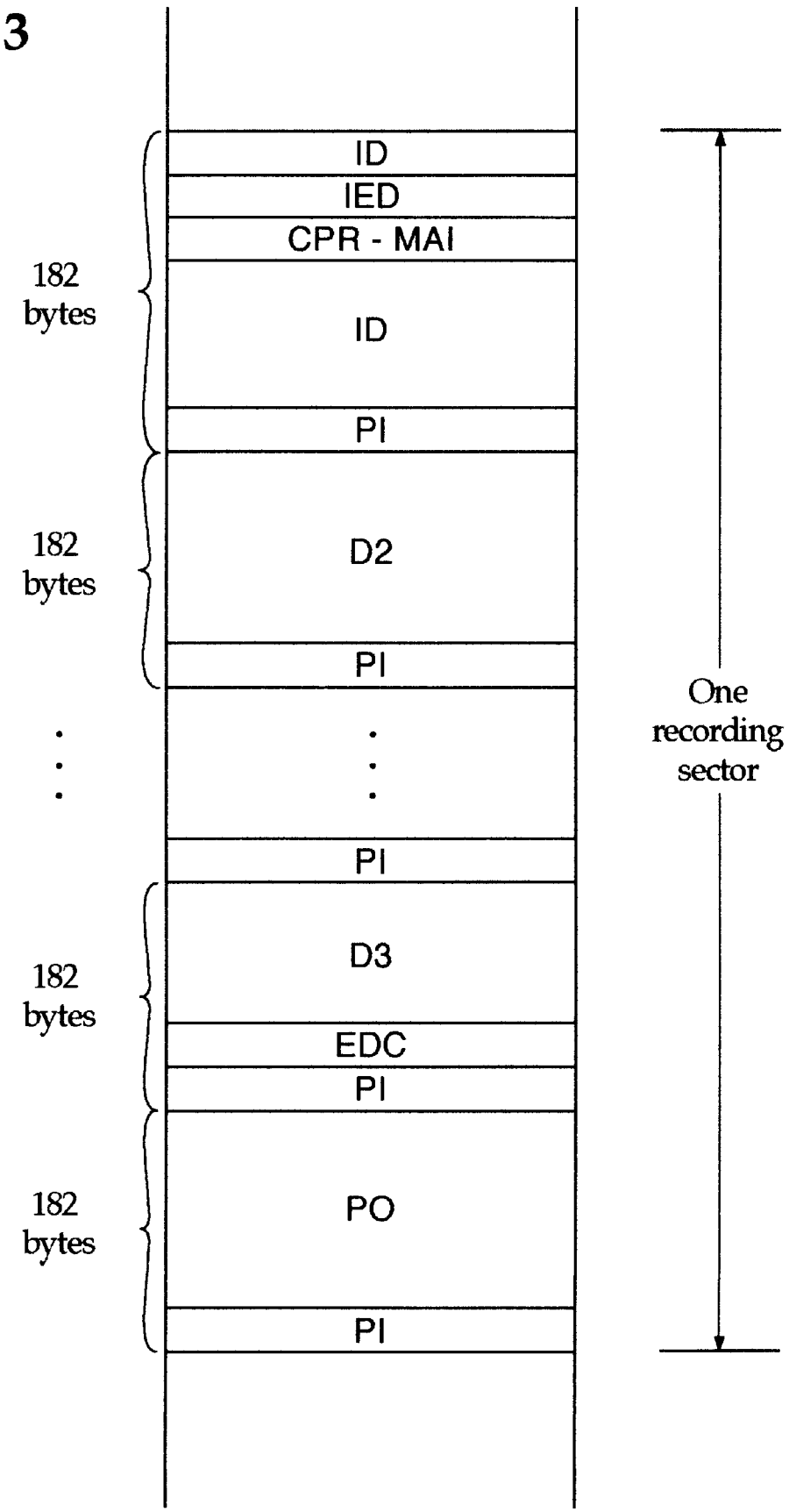
FIG. 3 is a diagram illustrating the data format for data as stored in a DRAM buffer after being read from a DVD disk.
Figure 4:
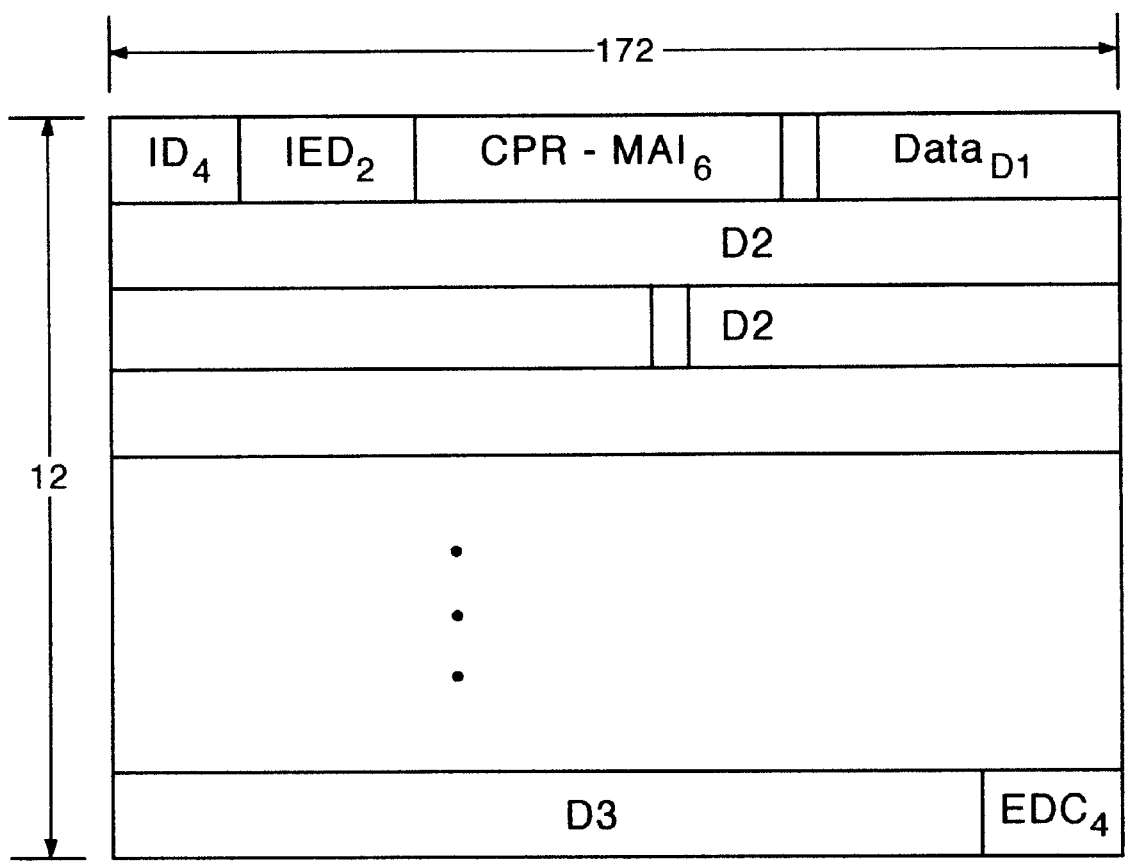
FIG. 4 is a diagram illustrating the data storage format for one sector of DVD data without ECC parity information.

FIG. 4 is a diagram illustrating the data storage format for one sector of DVD data without ECC parity information. For the purposes of initial discussion, the diagram of FIG. 4 is also useful in understanding how data is stored on a DVD disk. FIG. 3 illustrates how data is actually stored in the buffer DRAM with Error Correction Code (ECC) parity information, which will be discussed below.

Each sector, as illustrated in FIG. 4, contains 2064 bytes of data and codes in the following segments:

| Segment | Bytes | Description |
| --- | --- | --- |
| ID | 4 | Identification |
| IED | 2 | ID error detection (detection & correction for ID) |
| CPR-MAI | 6 | Copyright Management Information |
| DATA | 2048 | Data |
| EDC | 4 | Error Detection Code (for DATA) |

As illustrated in FIG. 4, each sector may be divided into 12 rows of 172 bytes each, the total of which is 2064 bytes of information, of which 2048 are data. As in prior art CD-ROMs and other rotating media, the concept of a data sector remains in DVD technology.

When making a new DVD disk, the ID (e.g., logical sector address) may be first determined, and then error detection/correction IED is calculated. Such error detection and correction techniques are well known in the art (e.g., hamming codes, and the like) and are not necessary for a complete understanding of the present invention. After the IED, six bytes are reserved for proprietary copyright information in the CPR-MAI field.

Actual data may then be stored after the CPR-MAI field. From the 2048 bytes of data, a four byte Error Detection Code EDC may be calculated using checksum, cyclic redundancy check (CRC) or the like. Error detection code EDC may represent an error detection code for data within the sector illustrated in FIG. 4. For purposes of illustration, Error Correction Codes (ECC) is not illustrated in FIG. 4.

Once an individual sector has been formatted, as illustrated in FIG. 4, the DATA portion may then be scrambled. At this point, actual data may not have been written to a DVD, but merely formatted and stored in preparation for writing (or manufacturing) a DVD. The non-DATA portions of the sector illustrated in FIG. 4 are not scrambled, only the DATA portion.

Figure 2:
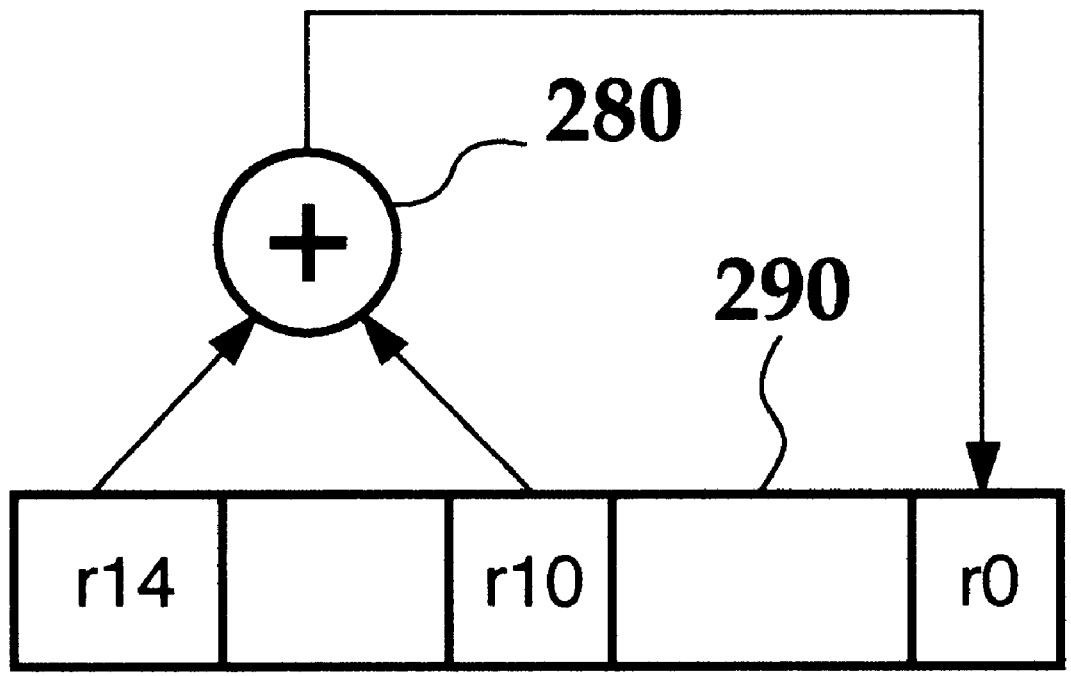
FIG. 2 is a simplified block diagram illustrating the operation of a scrambler for scrambling DVD data.

FIG. 2 is a simplified schematic representation of a DATA scrambler. Data is scrambled on a byte-by-byte basis. Each byte from the 2048 bytes in the sector of FIG. 4 is individually scrambled and then returned to its original location. Actual scrambling comprises taking an individual byte of data and XORing the data with a predetermined pattern byte. To descramble the data, one need only XOR the scrambled data with the correct pattern to retrieve the unscrambled data.

As illustrated in FIG. 2, the data scrambler works as follows. A starting "seed" of fifteen bits is stored in a shift register 290. Other numbers of bits may be used, but for DVD data, fifteen bits has been chosen. The eight least significant bits (LSB), or bits r0 through r7 of the contents of shift register 290 may be used to XOR with a particular data byte.

The first data byte may be XORed with the eight LSB of S_REG_HOLD_HALF. After that, the scrambler of FIG. 2 generates a new pattern from the contents of shift register 290 as follows. The contents of shift register 290 contain fifteen bits, $r_0$ through $r_{14}$. After a byte is scrambled, a new pattern is generated by shifting the contents of shift register 290 and XORing bit $r_{14}$ with bit $r_{10}$ in XOR gate 280 and placing the contents in bit $r_0$ of shift register 290 as illustrated in FIG. 2. This shift and XOR operation may be performed eight times to generate a new scrambling pattern from the previous contents of shift register 290.

Once each byte is scrambled, it is returned to its correct corresponding location in the sector of FIG. 4. Information indicating which of a number seed values is to be used may be dependent on the identification section ID. Thus, the seed value may change from sector to sector.

In the above description, error correction codes have not been discussed for the sake of clarity and simplicity. However, in actual practice, once all sectors, or a number of sectors, have been formatted, and prior to byte scrambling, other types of error correction codes may be applied as illustrated in FIG. 3.

FIG. 3 is a diagram illustrating the data storage format for data in the buffer memory with parity information. Data from a number of sectors (e.g., 16) is taken together to generate an error correction code comprising outer and inner parity values (PO and PI). Outer and inner parity values PO and PI may then be interleaved with DATA (D1, D2, D3) within each sector. The use of interleaved error correction codes is illustrated only for the sake of completeness, and forms no part of the present invention.

Outer and inner parity values PO and PI, however, are not scrambled or treated as regular data. Thus, once DATA has been assigned to individual sectors and scrambled, interleaved outer and inner parity values are calculated and assigned to each sector. DATA (but not outer and inner parity values PO and PI) are scrambled as discussed above. Before DATA is descrambled, parity values PO and PI are used to detect and correct errors in scrambled DATA.

The descrambling device of the present invention will divert PI and PO data from the descrambler and store such data directly in the buffer if the host demands such data. As the descrambling circuit has been preprogrammed with the standard DVD format, it may distinguish between scrambled DATA and PI and PO information.

The technique illustrated in FIG. 2 may be reproduced anywhere, so long as a user has the correct seed and combinational logic. Thus, a simple descrambler may be built from FIG. 2 as well. However, such a descrambler may require up to eight clock cycles between descrambling each byte in order to generate a new descrambling pattern value using the shift and XOR operation outlined above. Such a technique may be undesirable when descrambling data in real-time.

Figure 1:
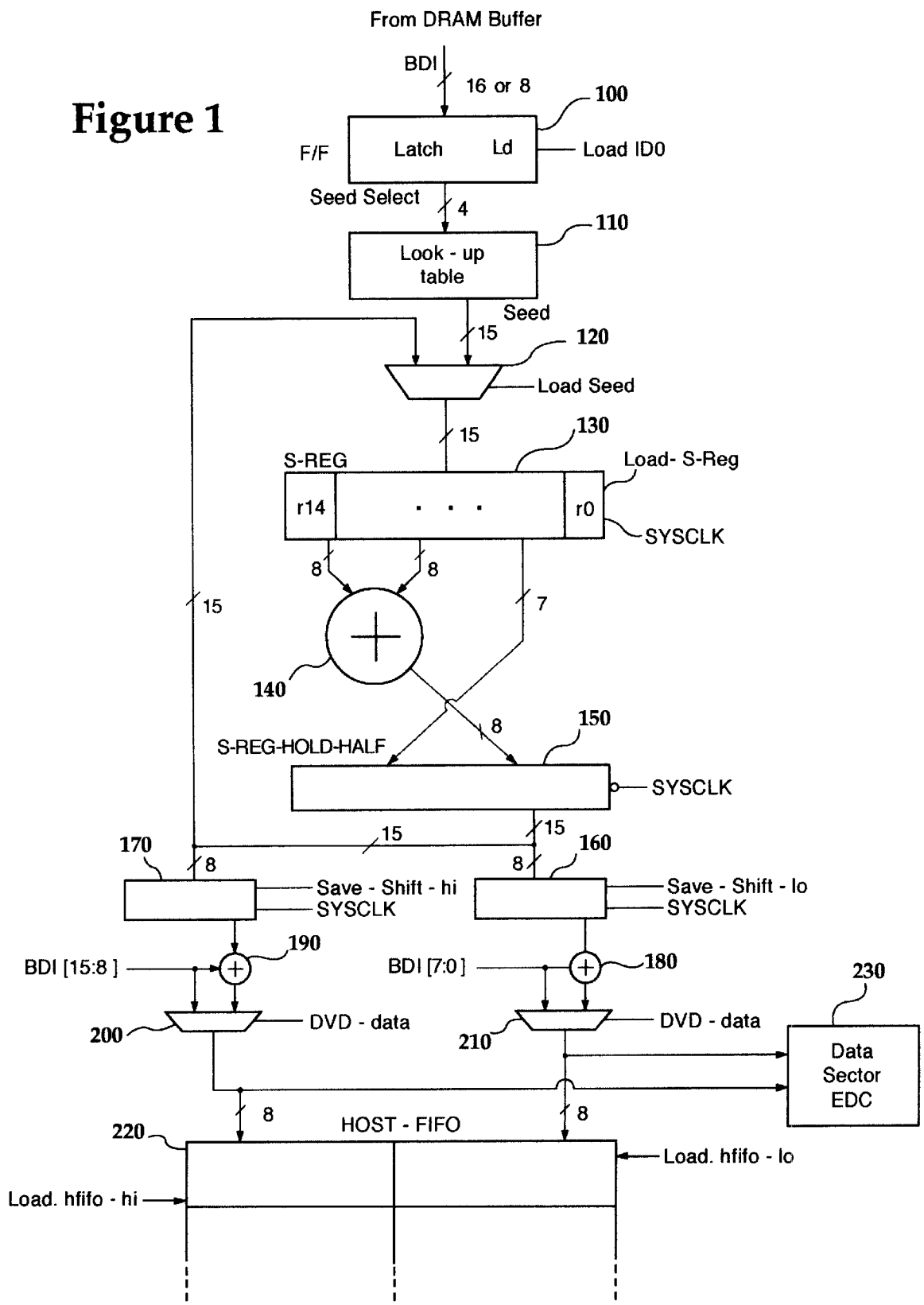
FIG. 1 is a block diagram illustrating a DVD descrambler which may descramble DVD data on a byte-by-byte basis.

FIG. 1 is a block diagram illustrating a DVD descrambler which may descramble DVD data on a byte-by-byte basis. Data from a DVD may be initially stored in raw form in a DRAM buffer (not shown). Data from the DRAM buffer may be fed over Buffer Data Input bus (BDI) which may comprise a 16 bit wide bus. Latch 100 may receive buffer data and latch 16 bits at the start of each sector in response to signal load_ID0. Signal load_ID0 may be generated from the start of a sector or the end of a previous sector.

Bits 4 through 7 of the ID field are used to select one of sixteen seed values from look-up table (LUT) 110. Predetermined seed values are stored in LUT 110 according to the DVD specification. The output of LUT 110 is the 15 bit SEED, which passes to MUX 120. At the start of each sector, signal LOAD SEED switches MUX 120 to load the 15 bit SEED value to S-REG 130. Thereafter, the value loaded into S-REG 130 is fed back as will be discussed in more detail below.

The fifteen bits of the SEED are loaded as bits r0 through $r_{14}$. As noted above, one difference between DVD applications and CD applications is that in CD-ROM and CD audio, most things are happening in a serial fashion. For example, in the CD-ROM area, there is also a similar scrambler, but that is doing a serial bit shifting, every clock, because data coming from the so-called DSP (Digital Signal Processor) chip is sent in a serial format to the controller. But now, by integrating the DSP and the controller together, it may be necessary to make everything byte- or word-oriented for better performance. What used to take eight clocks now takes only one or two clocks.

Because of that concern, a bit-by-bit shift may not be possible. Thus, S-REG 130, XOR gate 140 and S-REG-HOLD-HALF register 150 together performs a "flash" pattern generation using a shift and XOR operation to generate a descrambling pattern in one cycle. S-REG 130 operates on a half-clock cycle basis. Within one clock cycle, S-REG 130, S-REG-HOLD-HALF register 150, and XOR gate 140 perform the equivalent of eight place shifts and eight simultaneous XOR operations. As there are 15 bits in the pattern value, it is possible to obtain the next subsequent pattern without waiting for individual shift operations to be completed.

As illustrated in FIG. 1, the seven LSB of S-REG 130 are shifted into the seven Most Significant Bits (MSBs) of S-REG-HOLD-HALF register 150. The eight MSB of S-REG 130 are XORed together as follows and stored in the eight LSB of S-REG-HOLD-HALF register 150 according to the following equations:

$$s_1[7]=r_{14} \oplus r_{10} \quad (1)$$

$$s_1[6]=r_{13} \oplus r_9 \quad (2)$$

$$s_1[5]=r_{12} \oplus r_8 \quad (3)$$

$$s_1[4]=r_{11} \oplus r_7 \tag{4}$$

$$s_1[3]=r_{10} \oplus r_6 \tag{5}$$

$$s_1[2]=r_9 \oplus r_5 \tag{6}$$

$$s_1[1]=r_8 \oplus r_4 \tag{7}$$

$$s_1[0]=r_7 \oplus r_3 \tag{8}$$

In one embodiment of the present invention, a two clock cycle buffer may be used. Every two clock cycles, the buffer is accessed once to retrieve 16 bits. However, the apparatus of FIG. 1 produces one byte of pattern at a time. One byte of pattern is needed to generate one descrambled byte in one clock cycle so that a second clock cycle may generate a second byte, to form a word.

As illustrated in FIG. 1, the present invention uses a half-clock to temporarily store that pattern information in S-REG-HOLD-HALF register 150. Thus, when shifting the contents of S-REG 130, data is not destroyed and the shifted pattern may be retained to generate the next byte of pattern data.

S-REG-HOLD-HALF register 150 holds the new pattern and then sends it back to MUX 120. One input of MUX 120 is taking the new shifted pattern, while the other leg of MUX 120 is taking the SEED. For the first byte of each sector, the SEED is loaded into S-REG 130. For every subsequent byte of DATA in a sector, S-REG 130 is updated with new pattern data.

The output of S-REG-HOLD-HALF register 150 is fed to latches 160 and 170. Latch 160 will latch the eight LSB of the contents of S-REG-HOLD-HALF for a lower byte of buffer data BDI[7:0]. Latch 170 will latch the eight LSB of the contents of S-REG-HOLD-HALF for an upper byte of buffer data BDI[15:8]. XOR gate 180 will XOR eight bits of pattern data from latch 160 with a lower byte of buffer data BDI[7:0]. XOR gate 190 will XOR eight bits of pattern data from latch 170 with an upper byte of buffer data BDI[15:8]. The resulting descrambled data will be selectively stored in Host FIFO 220 in corresponding low and high bytes.

MUXES 200 and 210 are provided to allow data from buffer data interface bus BDI to bypass the descrambling process. As noted above, inner and outer parity information PI and PO are interleaved with DATA in each sector. Signal DVD-data indicates that data from buffer data interface bus BDI is in fact DATA and not parity information PI or PO, and switches XORed data into Host FIFO 220. If signal DVD-data indicates that data from buffer data interface BDI is PI or PO data, that data is switched directly to Host FIFO 220 without being XORed.

The apparatus of FIG. 1 may use two clock cycles to process one 16-bit word of data, providing adequate breathing room to process one byte in one clock cycle. A second clock cycle is used to process the high byte. Although the apparatus of FIG. 1 may be adequate for processing DVD data, in the preferred embodiment, it may be desirable to change to a different buffer access scheme, in which everything happens in one clock cycle.

Using such an address scheme, there may be problems with the architecture of FIG. 1, as there are not two clock cycles available to do an 8-bit shift. Thus, in the preferred embodiment, a 16-bit shift may be required within one clock cycle. One huge operation can shift the scrambler 16 times but still generate the correct pattern for the shifter. Such a system will allow increased performance in the buffer.

Figure 5:
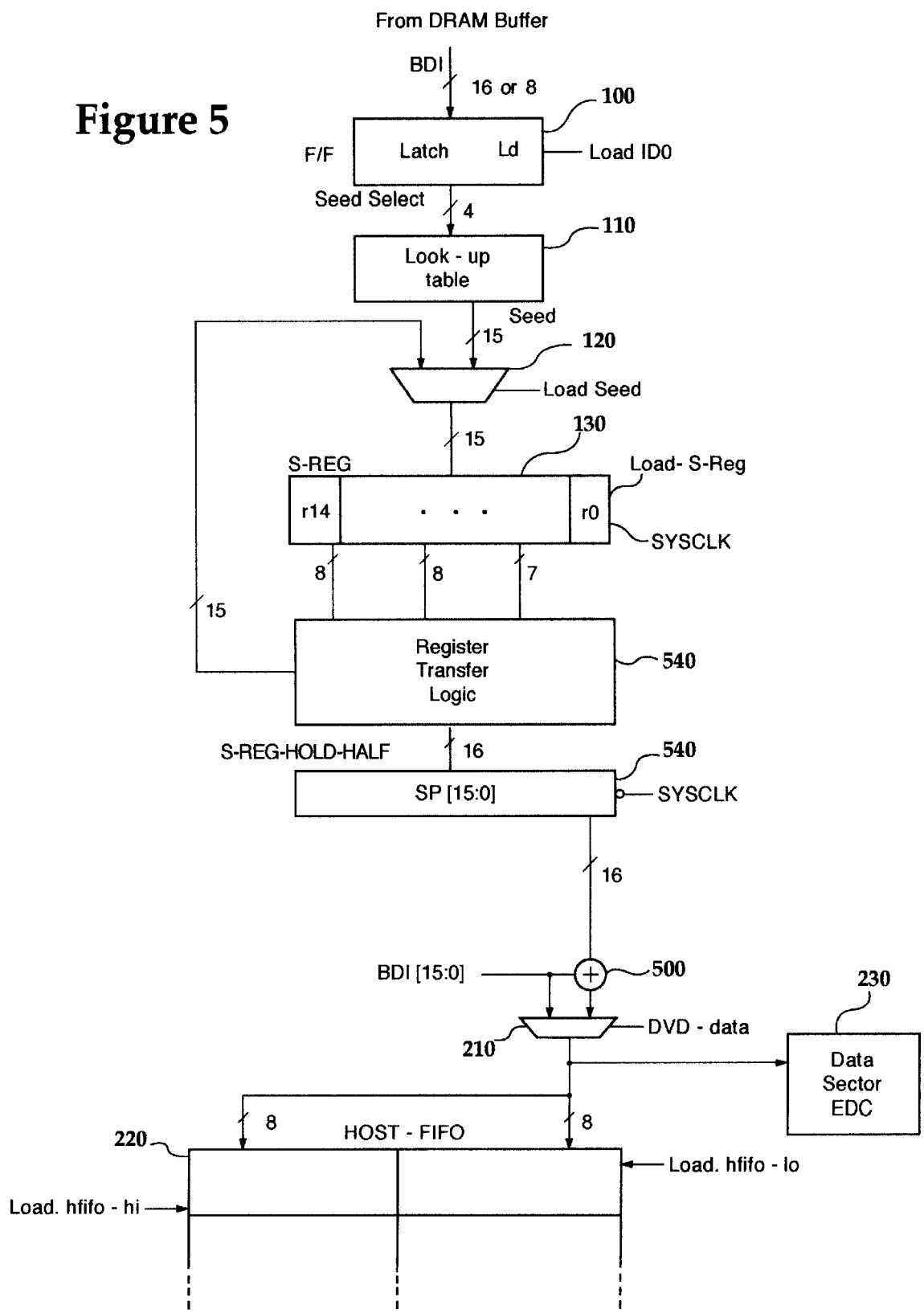
FIG. 5 is a block diagram illustrating a DVD descrambler of the preferred embodiment which may descramble DVD data on a word-by-word basis.

To implement such a design, the apparatus of FIG. 1 may be modified by replacing S-REG 130, XOR gate 140 and S-REG-HOLD-HALF register with an RTL (Register Transfer Logic) table and make the data paths wider as well. FIG. 5 is a block diagram illustrating a DVD descrambler of the preferred embodiment which may descramble DVD data on a word-by-word basis. The apparatus of FIG. 5 is similar to that in FIG. 1, except that the data path for the pattern has been expanded to sixteen bits, and sixteen bits of DATA from buffer data interface bus BDI are XORed in XOR gate 500 to descramble DATA.

XOR gate 140 has been replaced by Register Transfer Logic (RTL) 540 which operates according to equations 9–39 below. RTL 540 receives all fifteen bytes of pattern data from S-REG 130 and outputs two bytes of pattern data SP[15:0] to S-REG-HOLD-HALF register 150 which has been expanded to sixteen bits accordingly. Pattern data SP[15:0] represents two sequential bytes of pattern data for descrambling two successive bytes of DATA.

RTL 540 also outputs 15 bits of revised pattern data representing a revised 15 bit pattern corresponding to the high byte of a word. This 15 bit pattern is then fed back through S-REG 130 to generate the next two bytes of pattern data according to equations 9–39.

First Shift Equations:

$$s_1[14]=r_6 \tag{9}$$

$$s_1[13]=r_5 \tag{10}$$

$$s_1[12]=r_4 \tag{11}$$

$$s_1[11]=r_3 \tag{12}$$

$$s_1[10]=r_2 \tag{13}$$

$$s_1[9]=r_1 \tag{14}$$

$$s_1[8]=r_0 \tag{15}$$

$$s_1[7]=r_{14} \oplus r_{10} \tag{16}$$

$$s_1[6]=r_{13} \oplus r_9 \tag{17}$$

$$s_1[5]=r_{12} \oplus r_8 \tag{18}$$

$$s_1[4]=r_{11} \oplus r_7 \tag{19}$$

$$s_1[3]=r_{10} \oplus r_6 \tag{20}$$

$$s_1[2]=r_9 \oplus r_5 \tag{21}$$

$$s_1[1]=r_8 \oplus r_4 \tag{22}$$

$$s_1[0]=r_7 \oplus r_3 \tag{23}$$

Second Shift Equations:

$$s_2[14]=s_1[6]=r_{13} \oplus r_9 \tag{24}$$

$$s_2[13]=s_1[5]=r_{12} \oplus r_8 \tag{25}$$

$$s_2[12]=s_1[4]=r_{11} \oplus r_7 \tag{26}$$

$$s_2[11]=s_1[3]=r_{10} \oplus r_6 \tag{27}$$

$$s_2[10]=s_1[2]=r_9 \oplus r_5 \tag{28}$$

$$s_2[9]=s_1[1]=r_8 \oplus r_4 \tag{29}$$

$$s_2[8]=s_1[0]=r_{14} \oplus r_{10} \tag{30}$$

$$s_2[7]=s_1[14] \oplus s_1[10]=r_6 \oplus r_2 \tag{31}$$

$$s_2[6]=s_1[13] \oplus s_1[9]=r_5 \oplus r_1 \tag{32}$$

$$s_2[5]=s_1[12] \oplus s_1[8]=r_4 \oplus r_0 \tag{33}$$

$$s_2[4]=s_1[11] \oplus s_1[7]=r_3 \oplus r_{14} \oplus r_{10} \tag{34}$$

$$s_2[3]=s_1[10] \oplus s_1[6]=r_2 \oplus r_{13} \oplus r_9 \quad (35)$$

$$s_2[2]=s_1[9] \oplus s_1[5]=r_1 \oplus r_{12} \oplus r_8 \quad (36)$$

$$s_2[1]=s_1[8] \oplus s_1[4]=r_0 \oplus r_{11} \oplus r_7 \quad (37)$$

$$s_2[0]=s_1[7] \oplus s_1[3]=r_{14} \oplus r_{10} \oplus r_{10} \oplus r_6 \quad (38)$$

Scramble Pattern:

$$SD[15:0]=s_2[7:0]\&s1[7:0] \quad (39)$$

In equations 9–39, In this table, $S_1$ and $S_2$ represent the equivalent of a first and second shift (e.g., low byte and high byte), respectively, in a byte-by-byte descrambling system such as that illustrated in FIG. 1. As can be noted from equations 9–39, it is not necessary to perform the first shift in order to calculate values for the second shift. Thus, a combination logic circuit or the like may be readily constructed to generate the values of equations 9–39 in one clock cycle. In the preferred embodiment, a register transfer logic may be employed to implement equations 9–39.

Scrambler Pattern SD[15:0] equals the shift patterns S1[7:0] and S2[7:0] concatenated into one word. Scrambler pattern SD[15:0] may then be used to XOR with one word of DATA to descramble DATA on a word-by-word basis.

In both FIGS. 1 and 5, once data is descrambled, data may be output to the host buffer and also to data sector EDC 230. Data sector EDC 230 may perform a checksum, CRC or the like, to determine whether any errors have been introduced into sector data. If an error occurs, the sector may be re-read, processing may be halted, or other appropriate action taken.

One advantage of the present invention is that data is left untouched in the DRAM buffer, except when error correction occurs. Even when error correction occurs, only corrupted data is corrected, and the order of data is not altered. Raw (scrambled) data thus sits in the DRAM buffer waiting to be grabbed, to run through the circuit of FIGS. 1 or 5.

Although the present invention has been illustrated and described in detail, it is clearly understood that the same is by way of illustration and example only and is not to be taken by way of limitation, the scope and spirit of the present invention being limited only the terms of the appended claims.

What is claimed is:

1. An apparatus for descrambling scrambled data comprising:

a first register for receiving a first number of bits of pattern data;

pattern generating means, coupled to said first register, for receiving the first number of bits of pattern data and simultaneously generating a first number of bits of new pattern data;

a second register, coupled to the pattern generating means, for storing the first number of bits of new pattern data and for transmitting the first number of bits of new pattern data to the first register to form a pattern data for generating successive new pattern data.

2. The apparatus of claim 1, wherein said pattern generating means comprises:

a parallel XOR gate for XORing each of a second number of bits of the pattern data from the first register with a corresponding second number of bits of the pattern data from the first register, and outputting a second number of XORed bits as a second number of new pattern data bits in the second register.

3. The apparatus of claim 2, wherein said pattern generating means further comprises:

a shifter means for retrieving a third number of bits of the pattern data in the first register, and outputting the third number of bits as new pattern data to shifted locations in the second register.

4. The apparatus of claim 3, wherein the first number of bits comprises fifteen bits, the second number of bits comprises eight bits, and the third number of bits comprises seven bits.

5. The apparatus of claim 4, wherein said parallel XOR gate, simultaneously, XORs bit 14 of the pattern data with bit 10 of the pattern data to generate bit 7 of the new pattern data, XORs bit 13 of the pattern data with bit 9 of the pattern data to generate bit 6 of the new pattern data, XORs bit 12 of the pattern data with bit 8 of the pattern data to generate bit 5 of the new pattern data, XORs bit 11 of the pattern data with bit 7 of the pattern data to generate bit 4 of the new pattern data, XORs bit 10 of the pattern data with bit 6 of the pattern data to generate bit 3 of the new pattern data, XORs bit 9 of the pattern data with bit 5 of the pattern data to generate bit 2 of the new pattern data, XORs bit 8 of the pattern data with bit 4 of the pattern data to generate bit 1 of the new pattern data, and XORs bit 7 of the pattern data with bit 3 of the pattern data to generate bit 0 of the new pattern data.

6. The apparatus of claim 5, wherein said shifter shifts the seven most significant bits of the pattern data in the first register to produce the seven least significant bits of the new pattern data in the second register.

7. The apparatus of claim 1, further comprising:

a descrambling means, coupled to the second register, for combining a number of bits of the new pattern data with a corresponding number of bits of scrambled data to produce descrambled data.

8. The apparatus of claim 7, wherein said descrambling means comprises:

an XOR gate, coupled to the second register, for XORing a number of bits of the new pattern data with a corresponding number of bits of scrambled data to produce descrambled data.

9. The apparatus of claim 1, further comprising:

a buffer for storing data in a scrambled form.

10. An apparatus for descrambling scrambled data comprising:

a first register for receiving a first number of bits of pattern data;

pattern generating means, coupled to said first register, for receiving the first number of bits of pattern data and simultaneously generating a first number of bits of new pattern data and a second number of bits of descrambling data and for transmitting the first number of bits of new pattern data to the first register to form a pattern data for generating successive new pattern data;

a second register, coupled to the pattern generating means, for storing the second number of bits of descrambling data.

11. The apparatus of claim 10, further comprising:

a descrambling means, coupled to the second register, for combining a second number of bits of the descrambling data with a corresponding second number of bits of scrambled data to produce descrambled data.

12. The apparatus of claim 11, wherein said pattern generating means comprises:

logic for selectively combining a plurality of the first number of bits of the pattern data to simultaneously produce the first number of bits of the new pattern data and the second number of bits of descrambling data.

13. The apparatus of claim 12, wherein said first number comprises fifteen and said second number comprises sixteen.

14. The apparatus of claim 13, wherein said logic means, simultaneously,

XORs bit 14 of the pattern data with bit 10 of the pattern data to generate bit 7 of the descrambling data, XORs bit 13 of the pattern data with bit 9 of the pattern data to generate bit 6 of the descrambling data, XORs bit 12 of the pattern data with bit 8 of the pattern data to generate bit 5 of the descrambling data, XORs bit 11 of the pattern data with bit 7 of the pattern data to generate bit 4 of the descrambling data, XORs bit 10 of the pattern data with bit 6 of the pattern data to generate bit 3 of the descrambling data, XORs bit 9 of the pattern data with bit 5 of the pattern data to generate bit 2 of the descrambling data, XORs bit 8 of the pattern data with bit 4 of the pattern data to generate bit 1 of the descrambling data, and XORs bit 7 of the pattern data with bit 3 of the pattern data to generate bit 0 of the descrambling data.

15. The apparatus of claim 12, wherein said logic means, simultaneously,

XORs bit 6 of the pattern data with bit 2 of the pattern data to generate bit 15 of the descrambling data, XORs bit 5 of the pattern data with bit 1 of the pattern data to generate bit 14 of the descrambling data, XORs bit 4 of the pattern data with bit 0 of the pattern data to generate bit 13 of the descrambling data, XORs bit 3 of the pattern data with the XOR of bit 14 and bit 10 of the pattern data to generate bit 12 of the descrambling data, XORs bit 2 of the pattern data with the XOR of bit 13 and bit 9 of the pattern data to generate bit 11 of the descrambling data, XORs bit 1 of the pattern data with the XOR of bit 12 and bit 8 of the pattern data to generate bit 10 of the descrambling data, XORs bit 0 of the pattern data with the XOR of bit 11 and bit 7 of the pattern data to generate bit 9 of the descrambling data, and XORs bit 14 of the pattern data with the XOR of bit 10 and the XOR of bit 10 and bit 6 of the pattern data to generate bit 8 of the descrambling data.

16. The apparatus of claim 15, wherein said logic means comprises a register transfer logic.

* * * * *